United States Patent [19]

Wilkinson

[11] 4,380,800
[45] Apr. 19, 1983

[54] DIGITAL ROUGHNESS SENSOR

[75] Inventor: John R. Wilkinson, Dearborn, Mich.

[73] Assignee: The Bendix Corporation, Southfield, Mich.

[21] Appl. No.: 188,803

[22] Filed: Sep. 19, 1980

Related U.S. Application Data

[63] Continuation of Ser. No. 904,132, May 8, 1978, abandoned.

[51] Int. Cl.³ .................. F02D 5/02; F02M 51/00; F02B 3/08
[52] U.S. Cl. .................. 364/431.08; 73/659; 123/419; 123/478; 123/487; 364/431.03; 364/508
[58] Field of Search .................. 364/431.04, 431.08, 364/431.05, 431.06, 431.07, 431.12; 73/116, 462, 659, 660, 117.2, 117.3; 123/415, 416, 425, 435, 436, 478, 486, 488, 492, 493, 419

[56] References Cited

U.S. PATENT DOCUMENTS

| | | | |
|---|---|---|---|
| 3,733,892 | 5/1973 | Rennick | 73/659 |
| 3,749,070 | 7/1973 | Oishi | 123/422 |
| 3,789,816 | 2/1974 | Taplin et al. | 123/436 X |
| 3,800,599 | 4/1977 | Goran | 73/116 |
| 3,872,846 | 3/1975 | Taplin et al. | 123/568 |
| 3,885,420 | 5/1975 | Wolfinger | 73/650 |
| 3,897,766 | 8/1975 | Pratt, Jr. et al. | 123/426 |
| 3,935,846 | 2/1976 | Zelenka | 123/457 |
| 4,015,566 | 4/1977 | Wahl | 123/415 |
| 4,015,572 | 4/1977 | Leshner | 123/457 |
| 4,018,087 | 4/1977 | Wenz | 73/462 |
| 4,026,251 | 3/1977 | Schweitzer et al. | 123/436 |
| 4,044,234 | 8/1977 | Frobenius et al. | 123/436 X |
| 4,044,235 | 8/1977 | Frobenius et al. | 123/436 X |
| 4,044,236 | 8/1977 | Bianchi et al. | 123/431.06 |
| 4,064,846 | 12/1977 | Latsch et al. | 123/436 X |
| 4,092,955 | 6/1978 | Reddy | 73/650 |
| 4,104,990 | 8/1978 | Frobenius | 123/436 |
| 4,112,879 | 9/1978 | Assenheimer | 123/478 |
| 4,140,083 | 2/1979 | Frobenius | 364/431.08 |
| 4,161,162 | 7/1979 | Latsch et al. | 123/435 |
| 4,172,433 | 10/1979 | Bianchi et al. | 123/436 X |

FOREIGN PATENT DOCUMENTS

| | | | |
|---|---|---|---|
| 966223 | 4/1975 | Canada | 364/431.08 |
| 1512213 | 5/1978 | United Kingdom | 364/431.08 |
| 1520427 | 8/1978 | United Kingdom | 364/431.08 |

OTHER PUBLICATIONS

Randall et al., "Closed Loop Control of Internal Combustion Engine Efficiency and Exhaust Emissions," Stanford University Research Report Dot-OS-30111, May 1976 pp. 29–34.

Primary Examiner—Joseph F. Ruggiero
Attorney, Agent, or Firm—James R. Ignatowski; Gaylord P. Haas, Jr.; Russel C. Wells

[57] ABSTRACT

An engine roughness sensor for generating speed normalized digital roughness signals indicative of the variations in magnitude between successive torque impulses imparted to the engine's crankshaft by measuring the period or time it takes the crankshaft to rotate through the same angle for each torque impulse is disclosed herein. The digital roughness signal is normalized as a function of engine speed by dividing the measured magnitude of each torque impulse by a signal indicative of the engine speed to reduce the magnitude of operator induced variations in the generated roughness signals. In an alternate embodiment, the disclosed engine roughness sensor generates a second difference roughness signal which is the difference between the sequentially generated roughness signals.

27 Claims, 1 Drawing Figure

DIGITAL ROUGHNESS SENSOR

This is a continuation, of application Ser. No. 904,132, filed May 8, 1978, abandoned.

CROSS REFERENCE TO AND INCORPORATION OF RELATED CO-PENDING APPLICATIONS

This application is one of six applications originally filed on May 8, 1978 all commonly assigned and having substantially the same specification and drawings, the six applications being identified below:

| Parent Serial Number | Continuation Serial Number | Filing Date | Title |
| --- | --- | --- | --- |
| 904,131 | 187,400 | 9/15/80 | Closed Loop Timing and Fuel Distribution Control |
| 904,132 | 188,803 | 9/19/80 | Digital Roughness Sensor |
| 904,137 | 187,392 | 9/15/80 | Timing Optimization Control |
| 904,138 | 187,393 | 9/15/80 | Integrated Closed Loop Engine Control |
| 904,139 | 187,394 | 9/15/80 | Closed Loop Engine Roughness Control |

Application Ser. No. 904,129, now U.S. Pat. No. 4,197,767 which issued Apr. 15, 1980 and, has been printed in its entirety, including FIGS. 1-56, and the specification of that patent is specifically incorporated herein by reference.

PRIOR ART

Electronic ignition and fuel control systems for internal combustion engines are finding acceptance in the automotive and allied industries as rigid efficiency and pollution standards are imposed by the government. The first generation of these electronic controls were open loop systems which became progressively complex as the standards were raised. The number of variables needed to be detected as well as auxiliary circuits for providing corrections for these variables increased with each raising of the standards. From the conception of electronic control systems for internal combustion engines, it has been known that if the control system could be closed about the engine, simpler control systems could be developed. This would reduce the number of variables needed to be detected, reduce the complexity of the control systems, and at the same time improve the overall efficiency. The problem that has plagued the industry is the selection of an appropriate engine parameter about which to close the loop.

K. W. Randall and J. D. Powell from Stanford University in their research under a Department of Transportation sponsored project determined that for maximum efficiency of an internal combustion engine, the spark timing should be adjusted to provide a maximum cylinder pressure at a crankshaft angle 15 degrees past the piston's top dead center position. The results of this investigation are published in a Final Report NO SU-DAAR-503 entitled "Closed Loop Control of Internal Combustion Engine Efficiency and Exhaust Emission". The report contains a block diagram of a closed loop system in which a sensor detects the angle at which peak pressure occurs then compares this measured angle with the desired 15° angle. An error signal, generated when the measured angle differs from the desired angle, is used to correct the ignition timing signal generated in response to the other sensed engine parameters.

Comparable closed loop ignition control systems closed about the cylinder pressure are disclosed by M. M. Peterson in U.S. Pat. No. 3,957,023 entitled "Pressure Responsive Engine Ignition System" issued May 19, 1976 and Sand in U.S. Pat. No. 3,977,373 "Closed Loop Combustion Pressure Control" issued Aug. 31, 1976.

An alternate closed loop ignition control system taught by Pratt, Jr. et al. in U.S. Pat. No. 3,897,766 entitled "Apparatus Adapted to Opto-Electrically Monitor the Output of a Prime Mover to Provide Signals which are Fed Back to the Input and Thereby Provide Control of the Prime Mover" issued Aug. 5, 1975 embodies a torque sensor which measures the twist in the output shaft of the prime mover to measure the torque. The measured torque and engine speed are used to close the loop about the engine.

Harned et al in U.S. Pat. No. 4,002,155 entitled "Engine and Engine Spark Timing Control with Knock Limiting, etc." issued Jan. 11, 1977 teaches a closed loop ignition system in which engine knock-induced vibrations are detected by an engine mounted accelerometer. The system counts the number of individual ringing vibrations that occur in a predetermined angular rotation of the crankshaft. When the number of ringing vibrations exceed a predetermined number, the engine spark timing is retarded and when the number of ring vibrations is less than a second predetermined number, the spark timing is advanced.

Wahl in U.S. Pat. No. 4,015,566 entitled "Electronic Ignition Control System for Internal Combustion Engines" issued Apr. 5, 1977 teaches a closed loop ignition timing system closed about an operational parameter of the engine. In his patent, Wahl teaches sensing the temperature of a catalytic converter, the exhaust gas composition (especially NO compounds), or in the alternative using a vibration sensor to detect a rough running engine. The use of engine roughness as the measured parameter is similar to the system taught by Harned in U.S. Pat. No. 4,002,155 discussed above. In still another type of close loop system, Schweitzer et al. in U.S. Pat. No. 4,026,251 entitled "Adaptive Control System for Power Producing Machines" issued May 31, 1977 teaches dithering the ignition timing and closing the loop about the engine's speed.

The closed loop ignition timing systems in which the cylinder pressure is measured directly as taught by Randall and Powell and implemented in the patents to Peterson and Sand appear as the most direct and effective engine parameter about which to close the loop. However, this method requires a pressure transducer to be incorporated into at least one of the engine's cylinders where it is exposed to high temperatures and high pressures. Such pressure sensors are costly, have relatively short life expectancies and require additional modification to the engine for their use. Alternatively, pressure sensors adapted to be used in conjunction with the spark plugs are known but still suffer from the first listed deficiencies. The direct measurement of engine torque as taught by Pratt, Jr. et al. is an alternate approach but requires a relatively complex and expensive torque measuring sensor. The measurement of the onset of engine knock or roughness as taught by Harned et al. and Wahl respectively are believed to be too inaccurate to meet today's standards while the system taught by Schweitzer is believed to be ineffective because factors other than ignition timing such as a change in load could affect the engine speed and result in inproper ignition timing.

Various types of closed loop fuel control systems for internal combustion engines have been developed in which the loop is closed about different engine parameters. The one of the parameters about which the loop is closed is the composition of the exhaust gas as taught by Seitz in U.S. Pat. No. 3,815,561 "Closed Loop Engine Control System" issued June 11, 1974 as well as many others. The system taught by Seitz uses an oxygen ($O_2$) sensor detecting the concentration of oxygen in the exhaust gas and closes the loop about a stoichiometric mixture of air and fuel. However, a stoichiometric mixture of air and fuel has been found to be too rich for the efficient operation of the engine. Various techniques have been employed to operate the engine at leaner air fuel ratios but the ability to achieve reliable closed loop control at the desired leaner mixture is limited by the characteristics of the present day oxygen sensors.

An alternate approach is taught by Taplin et al. in U.S. Pat. No. 3,789,816 "Lean Limit Internal Combustion Engine Roughness Control System" issued Feb. 5, 1974 in which engine roughness is detected as the parameter about which the loop is closed. In this system, the air-fuel mixture is leaned out until a predetermined level of engine roughness is achieved. The magnitude of engine roughness is selected to correspond with a level of engine roughness at which the air fuel mixture is made as lean as possible to the point that the formation of such exhaust gas as HC and CO is minimized without the drivability of the particular vehicle being unacceptable. Engine roughness as measured in the Taplin et al. patent is the incremental change in the rotational velocity of the engine's output as a result of the individual torque impulses received from each of the engine's cylinders. The closing of the fuel control loop about engine roughness appears to be the most effective means for maximizing the fuel efficiency of the engine.

Leshner et al. in U.S. Pat. No. 4,015,572 teaches a similar type of fuel control system in which the loop is closed about engine power. In their preferred embodiment, Leshner et al. use exhaust back pressure as a manifestation of engine power, however, state that a measured torque, cylinder pressure, or a time integral of overall combustion pressure for one or more engine revolutions at a given RPM may be used in the alternative. In a more recent advertising brochure "Breaking the Lean Limit Barrier", Fuel Injection Development Corporation of Bellmawr, N.J., the assignee of the Leshner et al. patent, states that the parameter measured is the velocity of the engine's flywheel.

In another type of fuel control system using engine roughness as the sensed parameter to close the loop, Bianchi et al. in U.S. Pat. No. 4,044,236 teaches measuring the rotational periods of the crankshaft between two sequential revolutions of the engine. The differential is digitally measured in an up down counter counting at a frequency proportional to the engine speed.

In an alternate type of roughness closed loop fuel control system, Frobenius et al. in U.S. Pat. 4,044,234 "Process and Apparatus for Controlling Engine Operation Near the Lean-Running Limit" issued August, 1977, teaches measuring the rotational periods of two equal angular intervals, one before and one after the top dead center position of each piston. The change in the difference between the two rotational periods for the same cylinder is compared against a particular reference value and an error signal is generated when the change exceeds the reference value. Frobenius in U.S. Pat. No. 4,044,235 "Method and Apparatus For Determining Smooth Running Operation in an Internal Combustion Engine" issued August, 1977 teaches an alternate roughness control system wherein the periods of three sequential revolutions are compared to determine engine smoothness. The above reflects various ways in which engine roughness as detected by various means including the variations in the rotational velocity of the flywheel is used to close the loop about the engine.

The prior art teaches independent closed loop control systems, in which each control, i.e., ignition timing, fuel control, and fuel distribution are treated as separate entities. The Applicants herein teach an integrated engine control system in which the control loops for each controlled parameter are closed about a single measured engine operating parameter and in particular, the instantaneous rotational velocity of the engine's crankshaft. The data obtained from the singularly measured parameter is processed in different ways to generate timing and fuel delivery correction signals optimizing the conversion of combustion energy to rotational torque by the engine.

SUMMARY OF THE INVENTION

The invention is an engine roughness sensor for generating a speed normalized roughness signal. The sensor comprises a reference signal generator generating reference signals indicative of two different angular increments of crankshaft rotation for each torque impulse generated by the combustion of an air/fuel mixture in the individual cylinders of the engine. The two angular increments are selected such that the period or time it takes the crankshaft to rotate through the first angular increment is indicative of the engine speed while the time it takes the crankshaft to rotate through the second angular increment is indicative of the magnitude of the torque impulse.

A variable frequency oscillator generates a signal having a pulse frequency inversely proportional to the period of the first angular increment. An up counter enabled during each second angular increment counts the pulses generated by the variable frequency oscillator and generates a signal having a value directly proportional to the magnitude of the torque impulse as determined by the period of the second angular increment and inversely proportional to the engine speed as determined by the period of the first angular increment. At the end of the second angular increment, the content of the up counter is transferred to a down counter and the up counter is cleared. During the first angular increment of the next sequential torque impulse, the variable frequency oscillator generates a pulse signal at a frequency inversely porportional to the period of the first angular increment of the sequential torque impulse and in the second angular increment the up and down counters are enabled. The up counter again counts up at a rate determined by the signal generated by the variable frequency oscillator and the down counter is counted down by the signals generated by the variable frequency oscillator. At the end of the second angular increment associated with the sequential torque impulse, the up counter again stores a normalized roughness signal having a value proportional to the magnitude of the sequential torque impulse and the down counter has a value indicative of the difference between the normalized values of the first torque impulse and the normalized values of the sequential torque impulse. The absolute value of the content of the down counter at the end of the second rotational increment is an engine roughness signal.

In an alternate embodiment, the engine roughness signal generated at the end of the first sequential torque impulse is temporarily stored and is subtracted from the engine roughness signal generated at the end of a second sequential torque impulse to generate a second difference roughness signal indicative of the difference between two sequentially generated roughness signals.

The object of the invention is to generate a normalized engine roughness signal from the instantaneous rotational velocity of the engine's crankshaft. Another object of the invention is to generate an engine roughness signal normalized with respect to engine speed to minimize the effect of driver induced speed variations on the value of the generated roughness signals. These and other objects of the invention will be apparent from the reading of the specification in conjunction with FIGS. 32 through 35.

Figure 32:
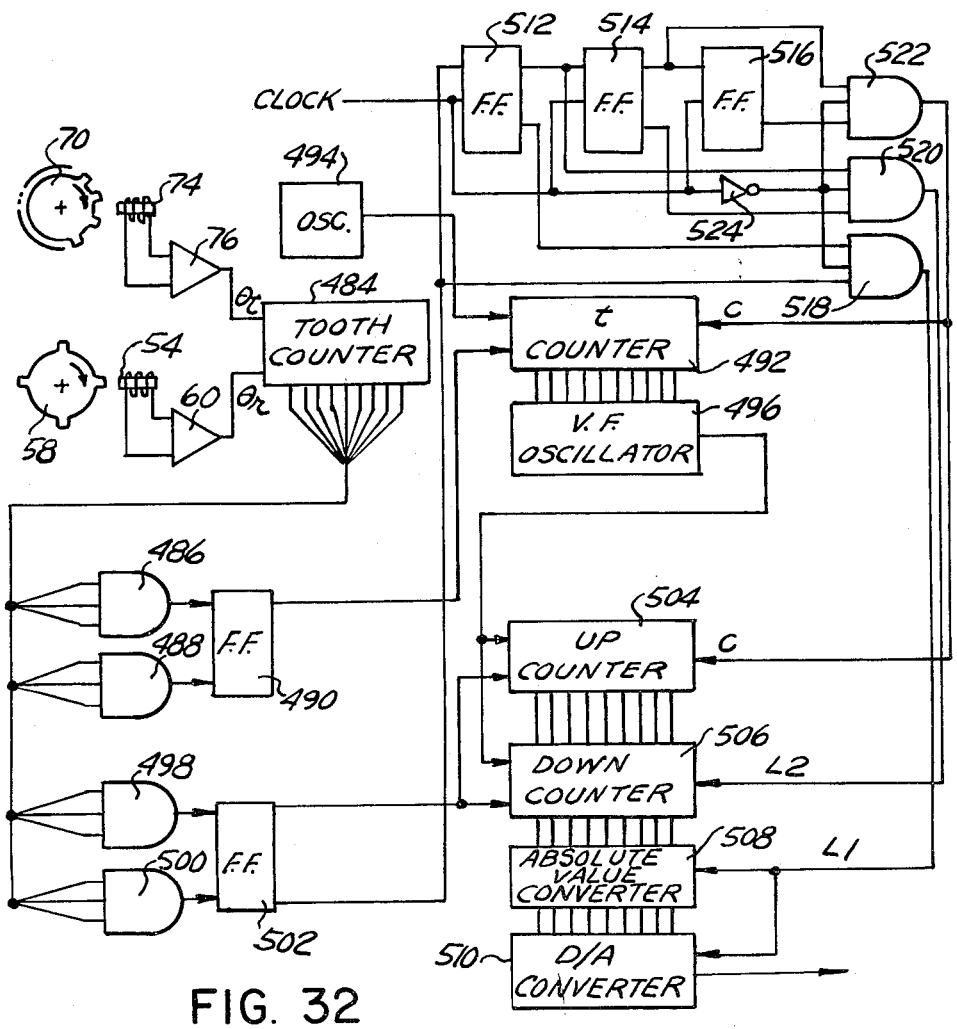
FIG. 32 is a circuit diagram of the Roughness Sensor.

For a better understanding of the drawing figures in this Application, reference is made to the same figure numbers of the above referenced patent, U.S. Pat. No. 4,197,767.

What is claimed is:

1. A roughness sensor for generating roughness signals indicative of the variation in the magnitude of the torque impulses imparted to a rotating element, the sensor comprising:
   means detecting the rotational position of the rotating element for generating first interval signals indicative of a first angular interval of the rotating element's rotation for each torque impulse, and for generating second interval signals indicative of a subsequent angular interval of the rotating element's rotation, wherein the rotating member has a maximum rotational velocity in response to each torque impulse in said subsequent angular interval;
   means response to said first and second interval signals for generating a normalized signal having a value proportional to the magnitude of the torque impulse determined by the time required by the rotating element to rotate through said subsequent angular interval and inversely proportional to engine speed determined by the time required for the rotating element to rotate through said first annular interval; and
   means for generating a roughness signal from at least two sequentially generated normalized signals, said roughness signal having a value equal to the difference between said sequentially generated normalized signals.

2. The sensor of claim 1 wherein said means for detecting comprises:
   angle encoder means connected to the rotating element for generating angle increment signals dividing a revolution of said rotating element into a plurality of small equal angular increments;
   means coupled to the rotating element for generating reference signals at predetermined angular positions of the rotating element with respect to each torque impulse;
   first counter means, reset by said reference signal for counting and storing a number indicative of the number of angle increment signals generated after the occurrence of said reference signal;
   decoder means responsive to the number stored in said first counter for generating said first and second interval signals, wherein said first interval signal is generated when the number is between two first predetermined numbers and said second interval signal is generated when the number is between two second predetermined numbers.

3. The sensor of claim 2 wherein a ring gear having a plurality of teeth disposed at equal angular increments is coupled to the rotating element, said encoder is a sensor detecting the passing of each tool on the ring gear as the rotating element rotates, for generating said angle increment signals.

4. The sensor of claim 2 wherein said decoder means comprises:
   an oscillator generating first oscillator signals at a predetermined rate;
   second counter means counting and storing said first oscillator signals in response to said first interval signal to generate a number indicative of the time required by the movable element to rotate through said first angular interval;
   variable frequency oscillator means for generating a second oscillator signal having a frequency inversely proportional to the number stored in said second counter means;
   up counter means for counting and storing a number indicative of the number of said second oscillator signals received during said second interval signal wherein the number stored in said up counter is said normalized signal.

5. The sensor of claim 4 wherein said means for generating a roughness signal comprises:
   down counter means receiving the number stored in said up counter means generated during a preceding second interval signal and counting said second oscillator signals generated in response to a subsequently received second interval signal for generating at the end of the second interval signal a number indicative of the roughness signal.

6. The sensor of claim 5 further including means for converting the number generated in the down counter at the end of the second period signal to an absolute value.

7. The sensor of claim 6 further including means for converting the absolute value of the number generated in the down counter at the end of each second period signal to an analog signal.

8. The sensor of claim 5 further including means for generating a second difference roughness signal indicative of the difference between two roughness signals.

9. The sensor of claim 8 wherein said means for generating a second difference roughness signal comprises:
   shift register means for temporarily storing the number generated in said down counter indicative of a first roughness signal at the end of the second interval signal;
   subtraction means for subtractng at the end of a subsequently generated second interval signal, the number stored in said shift register means from the new number generated in said down counter to generate said second difference roughness signal; and
   means for converting the number indicative of said second difference roughness signal to an absolute value.

10. The sensor of claim 9 further including means for converting the number indicative of said difference roughness signal to an analog signal.

11. A method for converting the instantaneous rotational velocity of a rotating member receiving torque impulses, varying the rotational velocity of said rotating member into roughness signals indicative of the variations in the individual torque impules comprising the steps of:

detecting predetermined angular positions of the rotating member to generate first interval signals indicative of a first angular interval of the rotating member for each torque impulse, and to generate second interval signals indicative of second angular intervals of the rotating member for each torque impulse in which the rotating member has a maximum change in rotational velocity in response to the associated torque impulse;

measuring for each torque impulse the time duration of said first interval signals to generate a signal indicative of the rotational velocity of the rotating member and the time duration of said second interval signal to generate a signal indicative of the magnitude of the torque impulse;

combining from the signal indicative of the rotational velocity of the rotating member and the magnitude of two torque impulses to generate a roughness signal having a value directly proportional to the difference between said two torque impulses and inversely proportional to the rotational velocity of the rotating member.

12. The method of claim 11 further including the step of converting said roughness signal to an absolute value.

13. The method of claim 12 further includes the step of converting said roughness signal to an analog signal.

14. The method of claim 11 wherein said step of detecting detects equal angular increments of the rotating elements rotation to generate a plurality of angle increment signals, each of said angular increment signals indicative of a small angular rotation of the rotating member;

detecting predetermined angular positions of the rotating member having a fixed annular relationship to each torque impulse to generate period reference signals;

counting and storing the number of angle increment signals generated after each period reference signal to generate a number indicative of the angular position of the rotating member with respect to each period reference signal;

decoding the number stored to generate said first interval signal when the number in said first counter is between a first and second predetermined number and to generate said second interval signal when the number stored is between a third and a fourth predetermined number.

15. The method of claim 14 wherein said rotating member is a ring gear having a plurality of teeth disposed at equal angular increments is coupled to said rotating element, said step of detecting detects the passing of each tooth on said ring gear as it rotates to generate said angle increment signals.

16. The method of claim 11 or 14 wherein said step of generating a roughness signal comprises the steps of:

generating oscillator signals having a predetermined frequency;

counting and storing said oscillator signals during each occurrence of said first interval signals to generate a first interval number indicative of the time duration of said first interval signal;

converting in a variable frequency oscillator said first interval number to a pulse signal having a frequency inversely proportional to said first interval number;

counting up and storing said pulse signals during each occurrence of said second interval signal to generate an impulse magnitude number having a value proportional to the duration of said second interval signal and inversely proportional to the duration of said first interval signal; and counting down said impulse magnitude number with the pulse signals generated by said variable frequency oscillator during the sequential torque impulse to generate at the end of each second interval signal said roughness signal.

17. The method of claim 11 further including the steps of subtracting two sequentially generated roughness signals one from the other to generate a second difference roughness signal having a value indicative of the difference between two sequentially generated roughness signals.

18. The method of claim 17 further including the step of converting said second difference roughness signal to an absolute value.

19. A method for generating roughness signals indicative of the variation in the magnitude of the torque impulses to the output shaft of an internal combustion engine, the method comprising the steps of:

detecting the rotational position of the output shaft for generating first interval signals indicative of first angular interval of the output shaft's rotation for each torque impulse, and for generating second interval signals indicative of a subsequent angular interval of the output shaft's rotation, wherein the engine's output shaft has a maximum rotational velocity in response to each torque impulse in said subsequent angular interval;

generating a normalized signal having a value proportional to the magnitude of the torque impulse determined by the time duration of said second interval signal and inversely proportional to engine speed determined by the time duration of said first interval signal; and generating a roughness signal from subsequently generated normalized signals, said roughness signal having a value equal to the difference between at least two subsequently generated normalized signals.

20. A roughness sensor for generating roughness signals indicative of the variation in the magnitude of the torque impulses imparted to a moving element of an internal combustion engine, the sensor comprising:

means detecting the position of the moving element for generating first interval signals indicative of first interval of the moving element's motion for each torque impulse, and for generating second interval signals indicative of a subsequent interval of the moving element's motion, wherein the moving member has a maximum velocity in response to each torque impulse in said subsequent angular interval;

means responsive to said first and second interval signals for generating a normalized signal having a value proportional to the magnitude of the torque impulse determined by the time required by the moving element to move through said subsequent interval and inversely proportional to engine speed determined by the time required for the moving element to move through said first interval; and means for generating a roughness signal from at least two sequentially generated normalized signals, said rougness signal having a value equal to the difference between said sequentially generated normalized signals.

21. The sensor of claim 20 wherein said means for detecting comprises:

angle encoder means connected to the element for generating angle increment signals dividing a movement of said element into a plurality of small equal increments;

means coupled to the element for generating reference signals at predetermined positions of the element with respect to each torque impulse;

first counter means connected to be reset by said reference signal, said first counter means counting and storing a number indicative of the number of angle increment signals generated after the occurrence of said reference signal;

decoder means responsive to the number stored in said first counter for generating said first and second interval signals, wherein said first interval signal is generated when the number is between two first predetermined numbers and said second interval signal is generated when the number is between two second predetermined numbers.

22. The sensor of claim 21 further including a ring gear having a plurality of teeth disposed at equal angular increments is coupled to the element, said encoder is a sensor detecting the passing of each tooth on the ring gear as the element rotates, for generating angular increment signals.

23. A method for converting the instantaneous velocity of a moving member receiving torque impulses, said impulses varying the velocity of the moving member, into roughness signals indicative of the variations in the individual torque impulses comprising the steps of:

detecting predetermined positions of the moving member to generate first interval signals indicative of a first interval of the moving member for each torque impulse, and to generate second interval signals indicative of second intervals of the moving member for each torque impulse in which the moving member has a maximum change in velocity in response to the associated torque impulse;

measuring for each torque impulse during the time duration of said first interval signals to generate a signal indicative of the velocity of the moving member and the time duration of said second interval signal to generate a signal indicative of the magnitude of the torque impulse; and then combining from the signal indicative of the velocity of the moving member and the magnitude of two torque impulses to generate a roughness signal having a value directly proportional to the difference between said two torque impulses and inversely proportional to the velocity of the moving member.

24. The method of claim 23 further including the step of converting said roughness signal to an absolute value.

25. The method of claim 24 further includes the step of converting said roughness signal to an analog signal.

26. The method of claim 23 further including the steps of subtracting two sequentially generated roughness signals one from the other to generate a second difference roughness signal having a value indicative of the difference between two sequentially generated roughness signals.

27. The method of claim 26 further including the step of converting said second difference roughness signal to an absolute value.

* * * * *